United States Patent
Loc

(10) Patent No.: US 8,045,535 B1
(45) Date of Patent: *Oct. 25, 2011

(54) POWER-EFFICIENT CHANNEL CONDITION FEEDBACK FOR OFDM CHANNELS

(75) Inventor: Peter Loc, Cupertino, CA (US)

(73) Assignee: Marvell International Ltd., Hamilton (BM)

( * ) Notice: Subject to any disclaimer, the term of this patent is extended or adjusted under 35 U.S.C. 154(b) by 531 days.

This patent is subject to a terminal disclaimer.

(21) Appl. No.: 12/154,031

(22) Filed: May 20, 2008

Related U.S. Application Data

(63) Continuation of application No. 11/068,441, filed on Feb. 28, 2005, now Pat. No. 7,385,959.

(60) Provisional application No. 60/652,423, filed on Feb. 11, 2005.

(51) Int. Cl.
*H04W 4/00* (2009.01)

(52) U.S. Cl. .......... 370/338; 455/68; 455/574; 370/220; 370/221; 370/431; 370/465

(58) Field of Classification Search .................. 370/338, 370/430, 431, 465, 220, 221; 455/574, 67.11, 455/68

See application file for complete search history.

(56) References Cited

U.S. PATENT DOCUMENTS

| | | | | |
|---|---|---|---|---|
| 6,574,453 | B1 * | 6/2003 | Honda et al. | 455/11.1 |
| 7,340,615 | B2 * | 3/2008 | Krantz et al. | 713/300 |
| 7,359,311 | B1 * | 4/2008 | Paranjpe et al. | 370/203 |
| 2004/0001429 | A1 | 1/2004 | Ma et al. | |
| 2004/0203472 | A1 * | 10/2004 | Chien | 455/68 |
| 2005/0135318 | A1 | 6/2005 | Walton et al. | |
| 2006/0008020 | A1 | 1/2006 | Blankenship et al. | |
| 2006/0120395 | A1 | 6/2006 | Xing et al. | |

OTHER PUBLICATIONS

IEEE 802.11a; Supplement to IEEE Standard for Information Technology—Telecommunications and information exchange between systems—Local and metropolitan area networks—Specific requirements—Part 11: Wireless LAN Medium Access Control (MAC) and Physical Layer (PHY) specifications; High-speed Physical Layer in the 5 GHz Band; 1999; 91 pages.

IEEE P802.11g; Draft Supplement to Standard [for] Information Technology—Telecommunications and information exchange between systems—Local and metropolitan area networks—Specific requirements—Part 11: Wireless LAN Medium Access Control (MAC) and Physical Layer (PHY) specifications: Further Higher Data Rate Extension in the 2.4 GHz Band; Apr. 2003; 69 pages.

* cited by examiner

*Primary Examiner* — Wayne Cai
*Assistant Examiner* — Julio Perez

(57) ABSTRACT

A wireless device includes a transceiver that receives packets via a wireless channel. A measurement circuit measures a channel condition of the wireless channel when the measurement circuit is in an active state. A controller identifies a request for a channel condition of the wireless channel in a first packet received by the transceiver, transitions the measurement circuit from an inactive state to the active state in response to the request, and transitions the measurement circuit to the inactive state in response to the measurement circuit having completed measuring the channel condition of the wireless channel during processing of a second packet received by the transceiver.

45 Claims, 6 Drawing Sheets

POWER-EFFICIENT CHANNEL CONDITION FEEDBACK FOR OFDM CHANNELS

CROSS-REFERENCE TO RELATED APPLICATIONS

This application is a continuation of U.S. patent application Ser. No. 11/068,441, filed Feb. 28, 2005, which claims the benefit of U.S. Provisional Patent Application No. 60/652,423, filed Feb. 11, 2005, the disclosures thereof are incorporated by reference herein in their entirety.

BACKGROUND

The present invention relates generally to wireless data communications. More particularly, the present invention relates to providing feedback describing the condition of an Orthogonal Frequency Division Modulation (OFDM) channel.

Conventional OFDM-based Multiple Input, Multiple Output (MIMO) wireless data communication systems employ a feedback mechanism that provides information describing the condition of the OFDM channel so that transmitters on the channel can maximize the bandwidth of the channel. Each packet transmitted over the channel includes a preamble, a signal field, and a payload. Receivers use the preamble to synchronize with the transmitter, perform channel estimation, and adjust gain settings. The signal field specifies the data rate of the data packet that follows, the number of antennas used, and additional information to assist the receiver in decoding the data packet.

Each receiver on the channel measures the channel while receiving the preamble of each packet. The signal field includes a channel condition request bit that, when set, requests a channel condition report from the receiver. When the receiver receives a packet with the channel condition request bit set, the receiver transmits a channel condition report based on the most recent channel condition measurement taken by the receiver.

The receiver does not know in advance when it will receive a channel condition request. And by the time the receiver processes the signal field in a packet to determine whether the channel condition request bit in the signal field is set, the preamble portion of the packet has already passed through the receiver, and so cannot be measured. Therefore this scheme requires that the measurement circuit that measures the channel condition be constantly active (that is, powered). Therefore the measurement circuit constantly consumes power, which constitutes a significant battery drain for a mobile receiver.

SUMMARY

In general, in one aspect, the invention features a wireless data communications device comprising: a Multiple Input, Multiple Output (MIMO) transceiver to communicate on an Orthogonal Frequency Division Modulation (OFDM) channel; a measurement circuit having an active state and an inactive state, wherein the measurement circuit measures a channel condition of the OFDM channel in the active state; and a controller to place the measurement circuit in the active state after a request for the channel condition is received on the OFDM channel, and to place the measurement circuit in the inactive state after the measurement circuit measures the channel condition of the OFDM channel and until a further request for the channel condition is received on the OFDM channel.

In some embodiments, the MIMO transceiver comprises: a MIMO receiver to receive a signal on the OFDM channel, the signal comprising a first packet comprising a first preamble and a first signal field comprising a channel condition request, and a second packet following the first packet, the second packet comprising a second preamble; and wherein the measurement circuit measures the channel condition of the OFDM channel during reception of the second preamble. In some embodiments, the MIMO transceiver comprises: a MIMO transmitter to transmit a packet on the OFDM channel, the packet representing the channel condition of the OFDM channel measured by the measurement circuit. In some embodiments, the packet comprises a plurality of channel coefficients representing the channel condition of the OFDM channel. In some embodiments, the channel coefficients comprise an amplitude gain and frequency offset for each point in a Quadrature Amplitude Modulation (QAM) constellation representing the OFDM channel. In some embodiments, the MIMO transmitter transmits the packet according to a predetermined schedule. In some embodiments, the wireless data communications device is compliant with IEEE standard 802.11n.

In general, in one aspect, the invention features a method for a Multiple Input, Multiple Output (MIMO) wireless data communications device communicating on an Orthogonal Frequency Division Modulation (OFDM) channel, the method comprising: receiving, on the OFDM channel, a request for the channel condition of the OFDM channel; placing a measurement circuit of the wireless communications device in an active state after the request for the channel condition is received, wherein the measurement circuit measures the channel condition of the OFDM channel in the active state; and placing the measurement circuit in an inactive state after the measurement circuit measures the channel condition of the OFDM channel and until a further request for the channel condition of the OFDM channel is received on the OFDM channel.

In some embodiments, receiving the request for the channel condition of the OFDM channel comprises: receiving a signal on the OFDM channel, the signal comprising a packet comprising a preamble and a signal field comprising a channel condition request. Some embodiments further comprise receiving a second packet following the packet, the second packet comprising a second preamble; and wherein the measurement circuit measures the channel condition of the OFDM channel during reception of the second preamble. Some embodiments further comprise transmitting a packet on the OFDM channel, the packet representing the channel condition of the OFDM channel measured by the measurement circuit. In some embodiments, the packet comprises a plurality of channel coefficients representing the channel condition of the OFDM channel. In some embodiments, the channel coefficients comprise an amplitude gain and frequency offset for each point in a Quadrature Amplitude Modulation (QAM) constellation representing the OFDM channel. In some embodiments, the packet is transmitted according to a predetermined schedule. In some embodiments, the wireless data communications device is compliant with IEEE standard 802.11n.

In general, in one aspect, the invention features a wireless data communications device comprising: Multiple Input, Multiple Output (MIMO) transceiver means for communicating on an Orthogonal Frequency Division Modulation (OFDM) channel; means for measuring having an active state and an inactive state, wherein the means for measuring measures a channel condition of the OFDM channel in the active state; and controller means for placing the means for measuring in the active state after a request for the channel condition is received on the OFDM channel, and for placing the means for measuring in the inactive state after the means for measuring measures the channel condition of the OFDM channel and until a further request for the channel condition is received on the OFDM channel.

In some embodiments, the MIMO transceiver means comprises: MIMO receiver means for receiving a signal on the OFDM channel, the signal comprising a first packet comprising a first preamble and a first signal field comprising a channel condition request, and a second packet following the first packet, the second packet comprising a second preamble; and wherein the means for measuring measures the channel condition of the OFDM channel during reception of the second preamble. In some embodiments, the MIMO transceiver means comprises: MIMO transmitter means for transmitting a packet on the OFDM channel, the packet representing the channel condition of the OFDM channel measured by the means for measuring. In some embodiments, the packet comprises a plurality of channel coefficients representing the channel condition of the OFDM channel. In some embodiments, the channel coefficients comprise an amplitude gain and frequency offset for each point in a Quadrature Amplitude Modulation (QAM) constellation representing the OFDM channel. In some embodiments, the MIMO transmitter means transmits the packet according to a predetermined schedule. In some embodiments, the wireless data communications device is compliant with IEEE standard 802.11n.

In general, in one aspect, the invention features a computer program for a Multiple Input, Multiple Output (MIMO) wireless data communications device communicating on an Orthogonal Frequency Division Modulation (OFDM) channel, the computer program comprising: placing a measurement circuit of the wireless communications device in an active state after a request for a channel condition of the OFDM channel is received on the OFDM channel, wherein the measurement circuit measures the channel condition of the OFDM channel in the active state; and placing the measurement circuit in an inactive state after the measurement circuit measures the channel condition of the OFDM channel and until a further request for the channel condition of the OFDM channel is received on the OFDM channel.

In some embodiments, the request for the channel condition of the OFDM channel comprises receiving a packet comprising a preamble and a signal field comprising a channel condition request. In some embodiments, the measurement circuit measures the channel condition of the OFDM channel during reception of a preamble of a second packet received after the packet. Some embodiments further comprise causing the MIMO wireless data communications device to transmit a packet on the OFDM channel, the packet representing the channel condition of the OFDM channel measured by the measurement circuit. In some embodiments, the packet comprises a plurality of channel coefficients representing the channel condition of the OFDM channel. In some embodiments, the channel coefficients comprise an amplitude gain and frequency offset for each point in a Quadrature Amplitude Modulation (QAM) constellation representing the OFDM channel. In some embodiments, the packet is transmitted according to a predetermined schedule. In some embodiments, the wireless data communications device is compliant with IEEE standard 802.11n.

The details of one or more implementations are set forth in the accompanying drawings and the description below. Other features will be apparent from the description and drawings, and from the claims.

Figure 1:
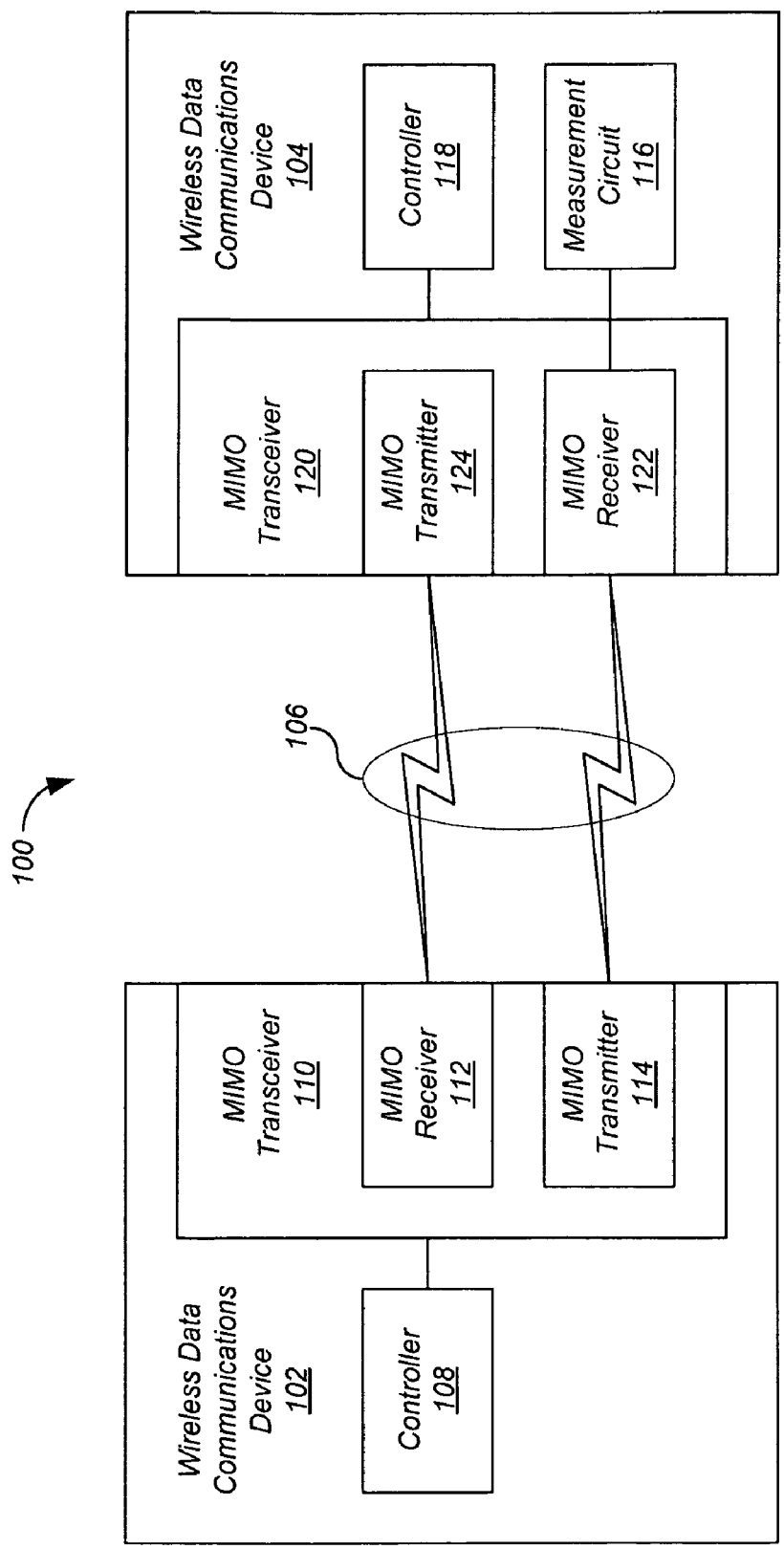
FIG. 1 shows a OFDM MIMO wireless data communications system comprising two wireless data communications devices communicating over a OFDM channel according to a preferred embodiment.

The leading digit(s) of each reference numeral used in this specification indicates the number of the drawing in which the reference numeral first appears.

DETAILED DESCRIPTION

Embodiments of the present invention provide OFDM channel condition feedback mechanisms that significantly reduce power consumption compared to conventional mechanisms. In particular, receivers according to these embodiments measure the OFDM channel condition only when requested by a transmitter on the channel. Therefore the measurement circuits in these receivers can be inactivated (that is, powered down) when channel measurements are not required, thereby achieving significant power savings compared to conventional receivers that measure the channel condition for each packet received, and therefore must power their measurement circuits continuously. While these mechanisms are especially useful in an N×M MIMO OFDM channel where the number of transmit antennas N>1 and/or the number of receive antennas M>1, they are also applicable to the case where N=M=1.

FIG. 1 shows a OFDM MIMO wireless data communications system 100 comprising two wireless data communications devices 102 and 104 communicating over a OFDM channel 106 that can be a direct wireless link between devices 102 and 104 or a wireless network such as a wireless local-area network (WLAN) that can operate in ad-hoc mode, infrastructure mode, or any other network mode. Wireless data communications devices 102 and 104 are compliant with IEEE standard 802.11n in embodiments where the number of transmit antennas N>1 and/or the number of receive antennas M>1, and with IEEE standards 802.11a and 802.11g where N=M=1.

Wireless data communications device 102 comprises a controller 108 and a MIMO transceiver 110 that comprises a MIMO receiver 112 and a MIMO transmitter 114. Of course, controller 108 can be implemented as part of MIMO transceiver 110 rather than separately.

Wireless data communications device 104 comprises a controller 118 and a MIMO transceiver 120 that comprises a MIMO receiver 122 and a MIMO transmitter 124. Wireless data communications device 104 also comprises a measurement circuit 116 to measure a channel condition of OFDM channel 106. Of course, controller 118 and/or measurement circuit 116 can be implemented as part of MIMO transceiver 120 rather than separately.

Measurement circuit 116 has an active state (that is, a state in which the active elements of measurement circuit 116 are powered) and an inactive state (that is, a state in which the some or all of the active elements of measurement circuit 116 are not powered). Measurement circuit 116 measures a channel condition of OFDM channel 106 in the active state according to well-known techniques. Measurement circuit 116 changes between active and inactive states under the control of controller 118.

Figure 2:
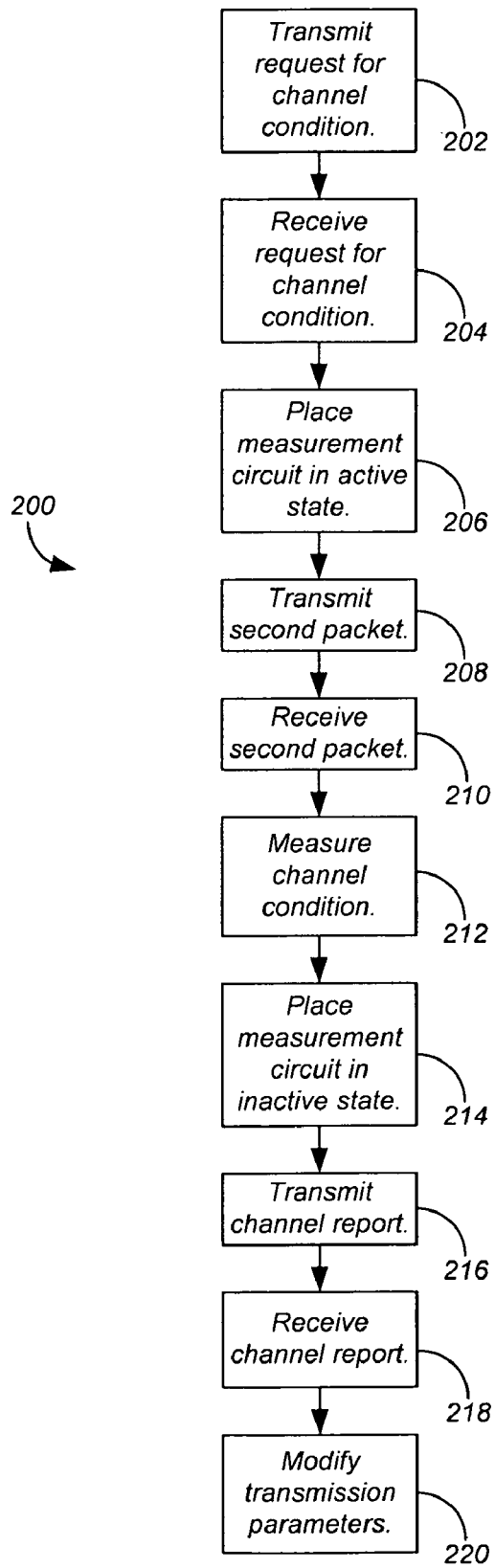
FIG. 2 shows a process for the wireless data communications system of FIG. 1 according to a preferred embodiment.

FIG. 2 shows a process 200 for wireless data communications system 100 of FIG. 1 according to a preferred embodiment. Controller 108 of wireless data communications device 102 causes MIMO transmitter 114 to transmit a packet that comprises a request for a channel condition of OFDM channel 106 (step 202).

Figure 3:
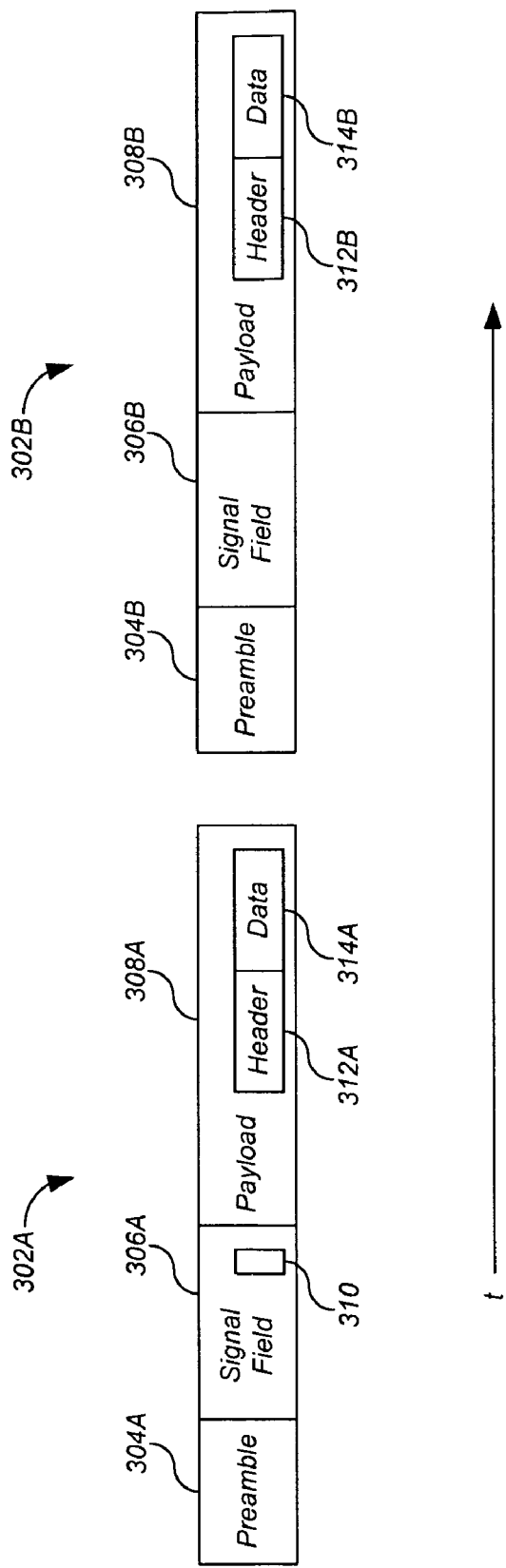
FIG. 3 shows a signal transmitted by the MIMO transmitter of FIG. 1 with respect to time t according to a preferred embodiment.

FIG. 3 shows a signal 300 transmitted by MIMO transmitter 114 with respect to time t according to a preferred embodiment. Each packet 302 transmitted by transmitter 114 comprises a preamble 304 followed first by a signal field 306, and then by a payload 308. Payload 308 preferably comprises a header 312 and a data field 314. Signal field 306 comprises a channel condition request bit 310 that, when set, indicates a request for the channel condition of the OFDM channel. When channel condition request bit 310 is set, the length of data field 314 is preferably set to zero. However, in some embodiments data field 314 is populated. When the channel condition request is directed to one or more specific wireless data communication devices 104, header 312 in payload 308 comprises the addresses of those devices 104. Otherwise header 312 can be omitted as well.

Receiver 122 of wireless data communications device 104 receives the packet comprising the channel condition request (step 204), which is shown as packet 302A in FIG. 3. Controller 118 places measurement circuit 116 in the active state after the request for the channel condition is received (step 206).

Transmitter 114 of wireless data communications device 102 transmits a second packet (step 208), which is shown as packet 302B in FIG. 3. Receiver 122 of wireless data communications device 104 receives packet 302B (step 210). Measurement circuit 116 measures the channel condition of OFDM channel 106 during reception of preamble 304B of packet 302B (step 212). After measurement circuit 116 measures the channel condition of OFDM channel 106, controller 118 places measurement circuit 116 in the inactive state (step 214), thereby conserving power when no measurement is needed.

MIMO transmitter 124 of wireless data communications device 104 then transmits a channel report packet on OFDM channel 106 that represents the channel condition of OFDM channel 106 as measured by measurement circuit 116 (step 216). The channel report packet preferably comprises a plurality of channel coefficients representing the channel condition of OFDM channel 106. The channel coefficients represent an amplitude gain and frequency offset for each point in a Quadrature Amplitude Modulation (QAM) constellation representing OFDM channel 106, as is well-known in the relevant arts.

The coefficients are complex numbers that are a function of the number Nc of subcarriers, the number Nt of antennas at the transmitter, and the number Nr of antennas at the receiver. Each complex coefficient is typically represented by 4 bytes of binary data. For IEEE 802.11a, Nc=52 requiring 52×4=208 bytes. For an IEEE 802.11n MIMO system with Nc=52 and Nt=Nr=2, the coefficients require 52×2×2×4=832 bytes.

Wireless data communications device 102 receives the channel condition report (step 218). Controller 108 modifies the transmission parameters of MIMO transmitter 114 in accordance with the channel coefficients in the channel condition report (step 220) according to techniques well-known in the relevant arts.

Figure 4:
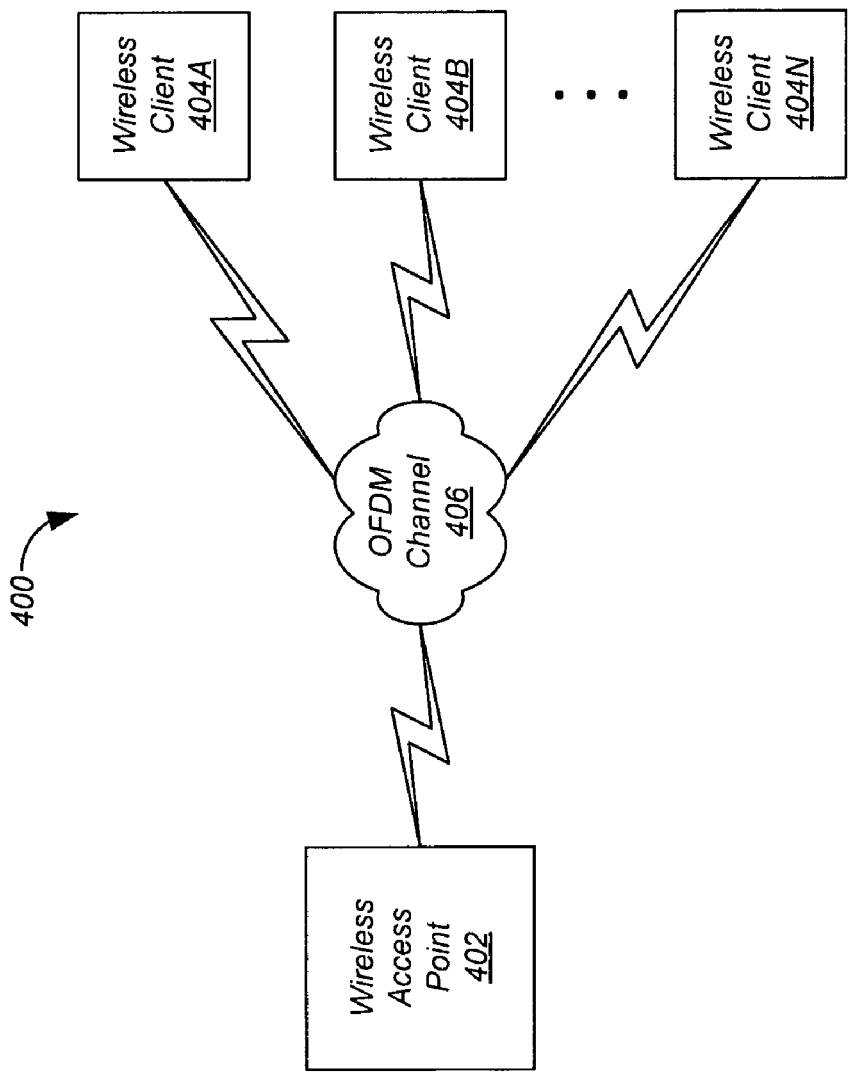
FIG. 4 shows a WLAN comprising a wireless access point communicating with a plurality of wireless clients over an OFDM channel according to a preferred embodiment.

In some embodiments, a single wireless communications device, such as an access point, collects channel condition measurements from a plurality of other wireless communications devices, such as wireless clients in an IEEE 802.11 infrastructure-mode WLAN. FIG. 4 shows a WLAN 400 comprising a wireless access point 402 communicating with a plurality of wireless clients 404A, 404B, through 404N over an OFDM channel 406 according to a preferred embodiment.

Figure 5:
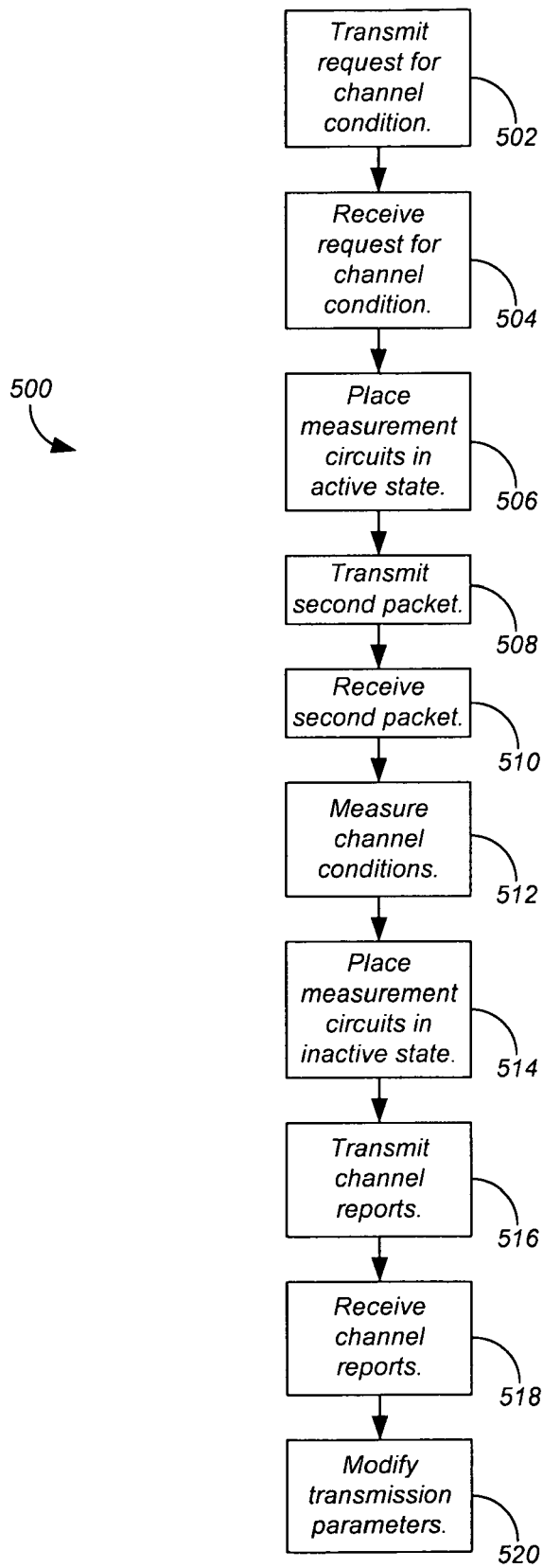
FIG. 5 shows a process for the WLAN of FIG. 4 according to a preferred embodiment.

FIG. 5 shows a process 500 for WLAN 400 of FIG. 4 according to a preferred embodiment. Wireless access point 402 transmits a packet 302A comprising a channel condition request (step 502). Packet 302 can be a broadcast packet or a multicast packet comprising the addresses of wireless clients 404A, 404B, through 404N.

Wireless clients 404 receive the packet (step 504), and place their measurement circuits 116 in the active state (step 506). Wireless access point 402 then transmits a second packet 302B (step 508). The measurement circuits 116 in wireless clients 404 receive the packet (step 510) and measure the condition of OFDM channel 406 during reception of the preamble 304B of packet 302B (step 512).

After measurement circuits 116 measure the channel condition of OFDM channel 406, wireless clients 404 place measurement circuits 116 in the inactive state (step 514), thereby conserving power when no measurement is needed.

Each wireless client 404 then transmits a channel report packet on OFDM channel 406 that represents the channel condition of OFDM channel 406 as measured by the measurement circuit 116 in that wireless client 404 (step 516). Preferably wireless clients 404 transmit the channel report packets according to a predetermined schedule that is communicated by wireless access point 402 to wireless clients 404 before the measurements take place. In other embodiments, wireless clients 404 transmit the channel report packets according to conventional channel access methods.

Figure 6:
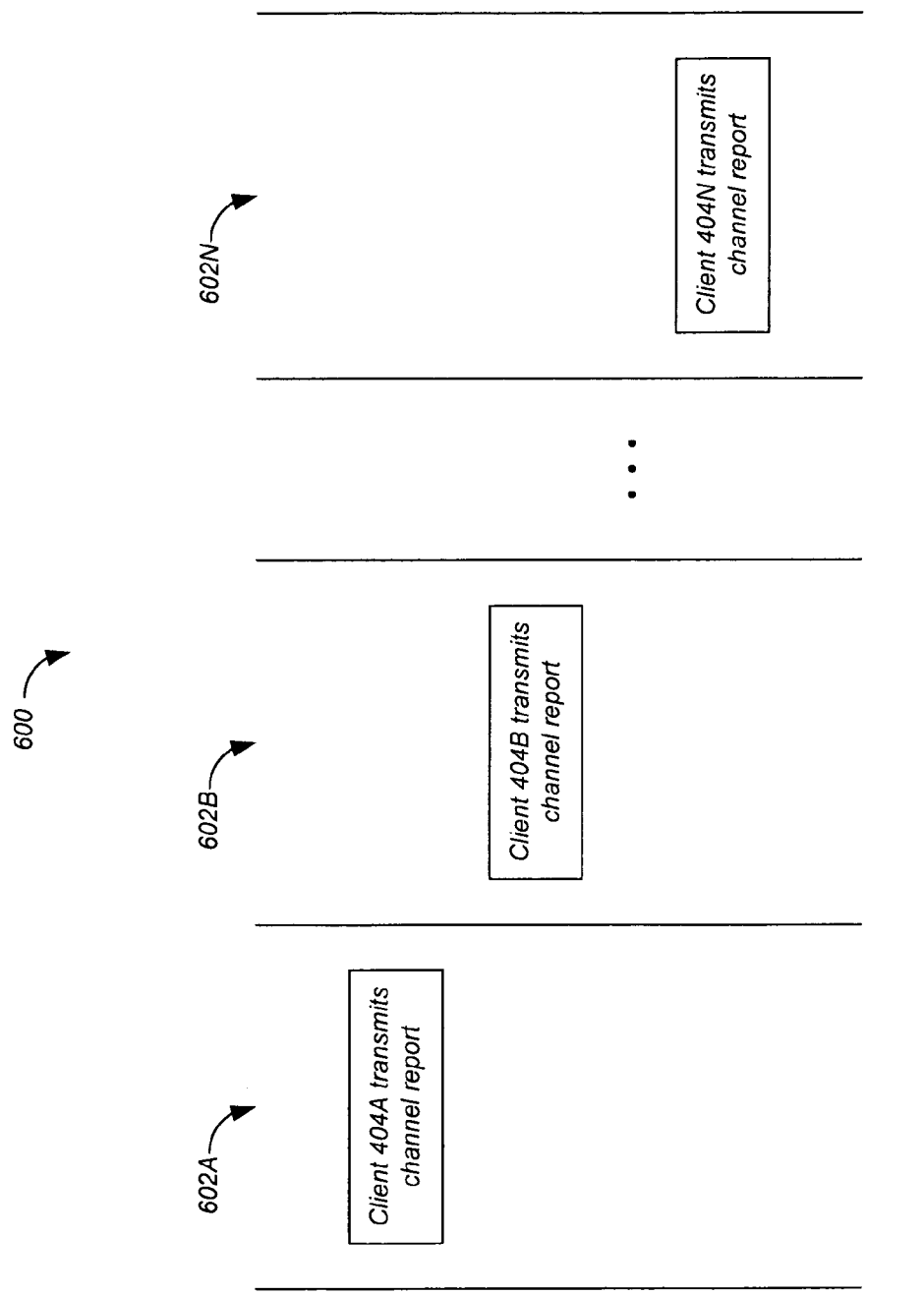
FIG. 6 shows an example schedule for transmission of the channel report packets.

FIG. 6 shows an example schedule 600 for transmission of the channel report packets. Wireless client 404A transmits its channel report packet during a first predetermined time slot 602A. Wireless client 404B transmits its channel report packet during a second predetermined time slot 602B, and so on. Finally, wireless client 404N transmits its channel report packet during a final predetermined time slot 602N. Of course, other scheduling techniques can be used.

Wireless access point 402 receives the channel condition reports (step 518). Controller 108 in wireless access point 402 modifies the transmission parameters of MIMO transmitter 114 in wireless access point 402 in accordance with the channel coefficients in the channel condition reports (step 520) according to techniques well-known in the relevant arts.

Aspects of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

A number of implementations of the invention have been described. Nevertheless, it will be understood that various modifications may be made without departing from the spirit and scope of the invention. Accordingly, other implementations are within the scope of the following claims.

What is claimed is:

1. A wireless device comprising:
    a transceiver configured to receive packets via a wireless channel, wherein the packets are transmitted from a network device to the wireless device via the wireless channel and include a first packet and a second packet;
    a measurement circuit configured to measure a channel condition of the wireless channel when the measurement circuit is in an active state; and
    a controller configured to
        identify a request for the channel condition of the wireless channel in the first packet received by the transceiver,
        transition the measurement circuit from an inactive state to the active state in response to the request, and
        transition the measurement circuit to the inactive state in response to the measurement circuit having completed measuring the channel condition of the wireless channel, wherein the measuring of the channel condition is performed during processing of the second packet received by the transceiver.

2. The wireless device of claim 1, wherein the measurement circuit is configured to measure the channel condition of the wireless channel during at least one of processing or receiving a preamble of the second packet.

3. The wireless device of claim 2, wherein the measurement circuit is configured to measure the channel condition of the wireless channel based on the preamble of the second packet.

4. The wireless device of claim 1, wherein the transceiver is configured to transmit a third packet that indicates the channel condition of the wireless channel.

5. The wireless device of claim 4, wherein the third packet comprises a plurality of channel coefficients.

6. The wireless device of claim 5, wherein each of the channel coefficients is generated based on, for each point in a constellation representing the wireless channel, (i) an amplitude gain and (ii) a frequency offset.

7. The wireless device of claim 1, wherein the transceiver comprises a multiple input multiple output transceiver.

8. The wireless device of claim 1, wherein the wireless channel comprises an orthogonal frequency division modulation channel.

9. The wireless device of claim 1, wherein the controller is configured to, based on a channel condition request bit in the first packet, activate and deactivate the measurement circuit.

10. The wireless device of claim 1, wherein the channel condition is measured based on an amplitude gain and a frequency offset.

11. A method for operating a wireless device, the method comprising:
    receiving packets via a wireless channel, wherein the packets are transmitted from a network device to the wireless device via the wireless channel and include a first packet and a second packet;
    identifying, in the first packet received via the wireless channel, a request for a channel condition of the wireless channel;
    transitioning a measurement circuit from an inactive state to an active state in response to the request;
    when the measurement circuit is in the active state, measuring the channel condition of the wireless channel using the measurement circuit; and
    transitioning the measurement circuit to the inactive state in response to the measurement circuit having completed measuring the channel condition of the wireless channel,
    wherein the measuring of the channel condition is performed during processing of the second packet received via the wireless channel.

12. The method of claim 11, wherein the measuring of the channel condition of the wireless channel occurs during at least one of processing or receiving a preamble of the second packet.

13. The method of claim 11, further comprising transmitting a third packet that represents the channel condition of the wireless channel.

14. The method of claim 13, wherein the third packet comprises a plurality of channel coefficients.

15. The method of claim 14, wherein each of the channel coefficients is generated based on, for each point in a constellation representing the wireless channel, (i) an amplitude gain and (ii) a frequency offset.

16. The method of claim 11, wherein:
    the first packet includes a first preamble, a signal field, and a first payload; and
    the second packet includes a second preamble and a second payload.

17. The method of claim 16, wherein the first payload does not include a data field when the signal field includes a request for the channel condition of the wireless channel.

18. The method of claim 16, wherein the first payload does not include a header when the signal field includes a request for the channel condition of the wireless channel.

19. The method of claim 11, further comprising, based on a channel condition request bit in the first packet, activating and deactivating the measurement circuit.

20. The method of claim 11, wherein the channel condition of the wireless channel (i) is measured based on a preamble of the second packet and (ii) is not measured based on the first packet.

21. A wireless device comprising:
    a transceiver configured to receive packets via a wireless channel, wherein the packets are transmitted from a network device to the wireless device via the wireless channel and include a first packet and a second packet;
    a measurement circuit configured to measure a channel condition of the wireless channel when in an active state; and a controller configured to (i) identify a request for the channel condition in the first packet (ii) transition the measurement circuit from an inactive state to the active state prior to the second packet being received, and (iii) transition the measurement circuit to the inactive state subsequent to the measurement circuit measuring the channel condition, wherein the measurement circuit measures the channel condition while receiving the second packet.

22. The wireless device of claim 21, wherein the measurement circuit is configured to measure the channel condition of the wireless channel during a preamble of the second packet.

23. The wireless device of claim 22, wherein the channel condition (i) is measured based on the preamble of the second packet and (ii) is not measured based on the first packet.

24. The wireless device of claim 21, wherein the transceiver is configured to transmit a third packet on the wireless channel, wherein the third packet includes information regarding the channel condition of the wireless channel as measured by the measurement circuit.

25. The wireless device of claim 24, wherein the information regarding the channel condition of the wireless channel as measured by the measurement circuit comprises a plurality of channel coefficients.

26. The wireless device of claim 25, wherein each of the channel coefficients is generated based on (i) an amplitude gain and (ii) a frequency offset.

27. The wireless device of claim 25, wherein each of the channel coefficients is generated based on, for each point in a constellation representing the wireless channel, (i) an amplitude gain and (ii) a frequency offset.

28. The wireless device of claim 21, wherein the transceiver comprises a multiple input multiple output transceiver.

29. The wireless device of claim 21, wherein the wireless channel comprises an orthogonal frequency division modulation channel.

30. The wireless device of claim 21, wherein:
the first packet includes a first preamble, a signal field, and a first payload; and
the second packet includes a second preamble and a second payload.

31. The wireless device of claim 30, wherein the first payload does not include a data field when the signal field includes a request for a channel condition.

32. The wireless device of claim 30, wherein when the signal field includes a request for a channel condition, the first payload does not include a header.

33. The wireless device of claim 21, wherein the controller is configured to, based on a channel condition request bit in the first packet, activate and deactivate the measurement circuit.

34. The wireless device of claim 21, wherein the transceiver is configured to remain in an active state while the measurement circuit is transitioned between the active state and the inactive state.

35. A method for operating a wireless device, the method comprising:

receiving a first packet via a wireless channel, wherein the first packet is transmitted from a network device to the wireless device via the wireless channel, and wherein the first packet includes a request for a channel condition of the wireless channel;

in response to the request for the channel condition of the wireless channel contained in the first packet, transitioning a measurement circuit of the wireless device from an inactive state into an active state;

while in the active state and in response to receiving a second packet via the wireless channel and from the network device, measuring the channel condition of the wireless channel based on the second packet via the measurement circuit; and subsequent to the measurement circuit measuring the channel condition of the wireless channel, transitioning the measurement circuit from the active state to the inactive state.

36. The method of claim 35, wherein the measurement circuit measures the channel condition of the wireless channel while receiving a preamble of the second packet.

37. The method of claim 35, further comprising transmitting a third packet on the wireless channel, wherein the third packet includes information regarding the channel condition of the wireless channel as measured by the measurement circuit.

38. The method of claim 37, wherein the information regarding the channel condition of the wireless channel as measured by the measurement circuit comprises a plurality of channel coefficients.

39. The method of claim 38, wherein each of the channel coefficients are generated based on (i) an amplitude gain and (ii) a frequency offset.

40. The method of claim 38, wherein each of the channel coefficients is generated based on, for each point in a constellation representing the wireless channel, (i) an amplitude gain and (ii) a frequency offset.

41. The method of claim 35, wherein:
the first packet includes a first preamble, a signal field, and a first payload; and
the second packet includes a second preamble and a second payload.

42. The method of claim 41, wherein the first payload does not include a data field when the signal field includes a request for the channel condition of the wireless channel.

43. The method of claim 41, wherein the first payload does not include a header when the signal field includes a request for the channel condition of the wireless channel.

44. The method of claim 35, further comprising, based on a channel condition request bit in the first packet, activating and deactivating the measurement circuit.

45. The method of claim 35, wherein the channel condition (i) is measured based on a preamble of the second packet and (ii) is not measured based on the first packet.

* * * * *